United States Patent
Sato et al.

(10) Patent No.: US 6,728,047 B2
(45) Date of Patent: Apr. 27, 2004

(54) COMPACT PHOTOGRAPHING LENS

(75) Inventors: Hiroshi Sato, Hachioji (JP); Etsuro Kawakami, Hamura (JP)

(73) Assignees: Konica Corporation, Tokyo (JP); Casio Computer Co. Ltd., Tokyo (JP)

( * ) Notice: Subject to any disclaimer, the term of this patent is extended or adjusted under 35 U.S.C. 154(b) by 0 days.

(21) Appl. No.: 10/374,398

(22) Filed: Feb. 26, 2003

(65) Prior Publication Data

US 2003/0184883 A1 Oct. 2, 2003

(30) Foreign Application Priority Data

Mar. 5, 2002 (JP) ........................... 2002-058201

(51) Int. Cl.$^7$ .............. G02B 9/12; G02B 3/02
(52) U.S. Cl. ............... 359/786; 359/689; 359/784; 359/716
(58) Field of Search ............... 359/689, 690, 359/784–786, 791–792, 772–775, 741, 745, 748, 715–716

(56) References Cited

U.S. PATENT DOCUMENTS 3,998,527 A * 12/1976 Ikeda et al. ............... 359/716
5,202,795 A * 4/1993 Kashima .................. 359/645
6,134,052 A * 10/2000 Yano ....................... 359/689
6,476,982 B1 * 11/2002 Kawakami ................ 359/791

* cited by examiner

Primary Examiner—Scott J. Sugarman
Assistant Examiner—Darryl J. Collins
(74) Attorney, Agent, or Firm—Cohen, Pontani, Lieberman & Pavane

(57) ABSTRACT

This invention is related to a compact photographing lens wherein an aperture stop is arranged at a position closest to an object, a first lens group, a second lens group, and a third lens group are arranged sequentially from the object side, the first lens group is formed by arranging, sequentially from the object side, a first lens having a positive refracting power and a second lens having a negative refracting power and bonded to the first lens, the second lens being formed from a meniscus lens with a concave surface facing the object side, the second lens group is formed from only a third lens as a meniscus lens which has at least one aspherical refracting surface and a concave surface facing the object side, the third lens group is formed from only a fourth lens as a meniscus lens which has at least one aspherical refracting surface and a convex surface facing the object side.

3 Claims, 3 Drawing Sheets

F2.57

-0.1    0.1

SPHERICAL
ABERRATION

ω=30.4°

-0.1    0.1

ASTIGMATIC
ABERRATION

ω=30.4°

-2.0    2.0%

DISTORTION

F2.08

-0.1   0.1

SPHERICAL
ABERRATION

ω =30.2°

-0.1   0.1

ASTIGMATIC
ABERRATION

ω =30.2°

-2.0   2.0%

DISTORTION

FIG.5
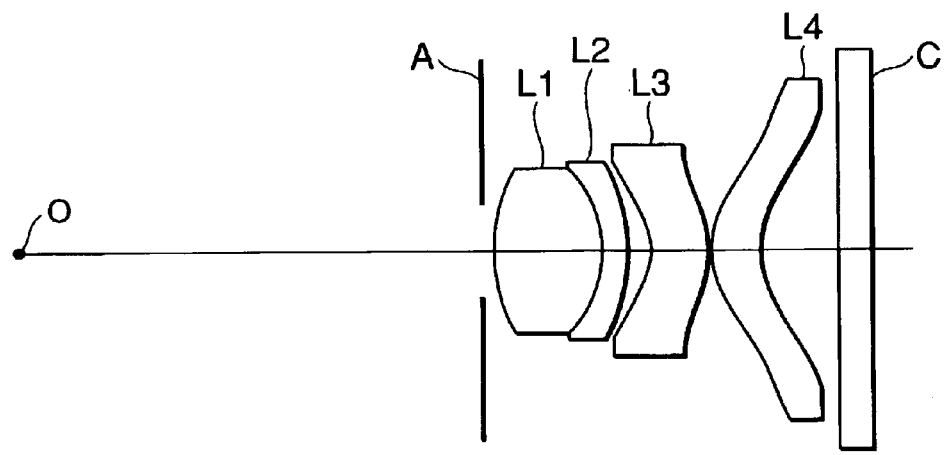
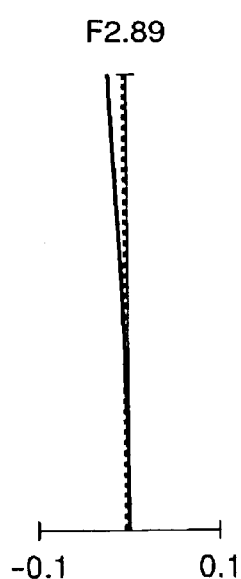
FIG.6A
F2.89
-0.1　0.1
SPHERICAL
ABERRATION
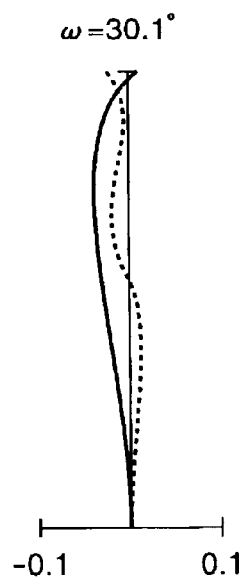
FIG.6B
ω=30.1°
-0.1　0.1
ASTIGMATIC
ABERRATION
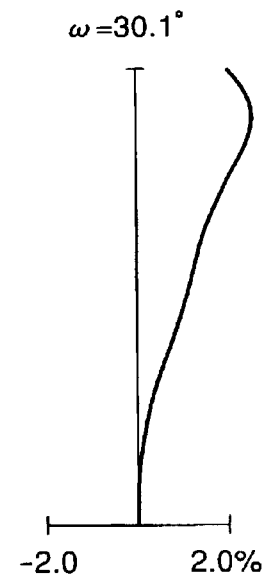
FIG.6C
ω=30.1°
-2.0　2.0%
DISTORTION

COMPACT PHOTOGRAPHING LENS

BACKGROUND OF THE INVENTION

1. Field of the Invention

The present invention relates to a photographing lens and, more particularly, to a high-performance compact photographing lens which is suitable for a compact image sensing apparatus, such as a digital still camera, monitor camera, or PC camera (an image sensing apparatus attached to a personal computer), using an image sensing device such as a CCD (Charge Coupled Device).

2. Description of the Related Art

In recent years, image sensing apparatuses such as digital still cameras for ordinary consumers are rapidly spreading. A digital still camera electrically receives, as image data, a still image formed by a photographing lens through an image sensing device such as a CCD (to be also referred to as a CCD or the like hereinafter) and records the image data in an internal memory or on a memory card. At first, a digital still camera has, as its fascination, immediate image playback and convenience which are unavailable in a silver halide film camera because the liquid crystal monitor can be used as a viewfinder in photographing and also as a playback monitor for a sensed image. However, many digital still cameras employ CCDs with small numbers of pixels. It has been pointed out that a digital still camera generally has a lower image resolution as compared to a silver halide film camera.

However, recent technological development makes it possible to supply inexpensive CCDs or the like with great numbers of pixels. When an image obtained by a digital still camera having a CCD with a large number of pixels is printed in, e.g., a popular size, the image has almost the same resolution as that of an image taken by a silver halide film camera.

A conventional photographing lens for a digital still camera will be examined. The photographing lens receives an image by using a CCD or the like having a large number of pixels. From this viewpoint, the photographing lens has an arrangement similar to that of a photographing lens for a video camera. However, the photographing lens for a digital still camera has a more complex arrangement because a high resolution and image quality are demanded. Additionally, when the image sizes of the CCDs are compared under same conditions, the photographing lens for a digital still camera is often larger than the photographing lens for a video camera.

Characteristics required for a conventional photographing lens for a digital still camera will be outlined below.

(1) Lens Must Cope with High Image Quality

The number of pixels in a CCD or the like is recently 3,000,000 to 4,000,000 even in digital still cameras for general consumers. This number of pixels is about 10 times larger than that of an image sensing element with 350,000 pixels, which is generally used in a video camera, although they have different image sizes and therefore cannot be compared directly. This means that they have such a difference even in aberration correction accuracy (correction difficulty) required for photographing lenses.

Currently, the number of pixels of a CCD or the like is generally increased by decreasing the pixel pitch while suppressing an increase in CCD size as much as possible. For example, a CCD or the like with 1,300,000 effective pixels, which is recently announced as an image sensing device for a digital still camera, has a pixel pitch of about 4.2 $\mu$m. Assumed to be twice the pixel pitch, the diameter of the circle of least confusion is 8.4 $\mu$m. The diameter of the circle of least confusion of a 35-mm silver halide film camera is probably about 33 $\mu$m. As is also apparent from this comparison, the resolution required of a photographing lens for a digital still camera is about four times that for a silver halide film camera. Furthermore, as the number of pixels of a CCD or the like increases, such requirement becomes stricter.

(2) Image-side Telecentricity must be Excellent

Image-side telecentricity is such a phenomenon that the principal ray of a light beam with respect to each image point becomes almost parallel to the optical axis, i.e., almost perpendicular to the image plane after principal ray exits the final surface of the optical system. In other words, the exit pupil position of the optical system is sufficiently far apart from the image plane. The reason why the image-side telecentricity is necessary is as follows. A color filter on the object side of the image sensing surface of a CCD or the like is located slightly far apart from the image sensing surface. If a light beam becomes incident obliquely, it is partially vignetted, and the actual aperture efficiency decreases (shading). The image-side telecentricity is necessary for solving or relaxing this disadvantage. Especially, a recent highly sensitive CCD or the like often has a microlens array immediately in front of the image sensing surface. In this case as well, if the exit pupil is not sufficiently far apart from the image plane, the aperture efficiency becomes low around the image plane. It is considerably significant to obtain excellent image-side telecentricity.

(3) Some Back-focus must be Ensured

In a CCD or the like, a protective glass plate must be arranged in front of the image sensing surface because of the structural requirement. In addition, a space that generally accommodates several optical elements must be ensured between the optical system and the CCD or the like of the photographing lens. Examples of the optical elements are an optical low-pass filter which is inserted to prevent moire and the like, which take place due to the periodical structure of the CCD or the like, and an infrared absorbing filter which is also inserted between the optical system and the CCD or the like in order to decrease the sensitivity of the CCD or the like in the infrared range and make the sensitivity closer to the spectral luminous efficiency. Hence, a photographing lens for a digital still camera requires some back-focus to accommodate such a glass plate and optical elements.

A photographing lens for a digital still camera has the above-described three characteristics (conditions) to be satisfied, unlike a lens for a silver halide film camera. In fact, there are recently indications that the requirement for the "image-side telecentricity" will be relieved by changing the layout of a color filter or microlens array in a CCD or the like, and the requirement for "back-focus" will be relieved by using other materials for an optical low-pass filter and the like and radically changing the structure of the CCD or the like.

As the conditions are moderated by these improvements, a development environment for a photographing lens which has excellent characteristics for a digital still camera and advantages in size and cost is being prepared.

SUMMARY OF THE INVENTION

The present invention has been made in consideration of the above situation and has, as its object, to provide a compact photographing lens having a high resolution and a small number of constituent elements.

In order to achieve the above object, according to the first aspect of the present invention, there is provided a compact photographing lens wherein an aperture stop is arranged at a position closest to an object, a first lens group, a second lens group, and a third lens group are arranged sequentially from the object side, the first lens group is formed by arranging, sequentially from the object side, a first lens having a positive refracting power and a second lens having a negative refracting power and bonded to the first lens, the second lens being formed from a meniscus lens with a concave surface facing the object side, the second lens group is formed from only a third lens as a meniscus lens which has at least one aspherical refracting surface and a concave surface facing the object side, the third lens group is formed from only a fourth lens as a meniscus lens which has at least one aspherical refracting surface and a convex surface facing the object side, and the photographing lens satisfies conditions (1) to (5):

$$0.80 < f/f_{1,2} < 1.00 \quad (1)$$

$$-0.10 < f/f_4 < 0.45 \quad (2)$$

$$0.2 < |f/r_{2\text{-}2}| < 1.6 \quad (3)$$

$$2.9 < |f/r_{3\text{-}1}| < 4.4 \quad (4)$$

$$2.0 < f/d_1 < 2.9 \quad (5)$$

where f: focal length of entire system $f_{1,2}$: combined focal length of first and second lenses $f_4$: focal length of fourth lens $r_{2\text{-}2}$: radius of curvature of image-side surface of second lens $r_{3\text{-}1}$: radius of curvature of object-side surface of third lens $d_1$: central thickness of first lens.

According to the second aspect of the present invention, in the photographing lens according to the first aspect, both the third and fourth lenses are made of a resin material and satisfy condition (6):

$$|f/f_{3,4}| < 0.35 \quad (6)$$

where $f_{3,4}$: combined focal length of third and fourth lenses.

Inequality (6) in the second aspect is related to the combined refracting power of the second and third lens groups, i.e., the third and fourth lenses. When both the second and third lens groups are made of a resin material, i.e., plastic, an aspherical surface can be applied. In addition, the cost reduction effect can be expected. As a characteristic feature of a plastic lens, it is readily affected by a change in temperature. However, when the value $|f/f_{3,4}|$ representing the combined refracting power of the second and third lens groups falls within the range of inequality (6), focal point movement in case of a change in temperature can be made sufficiently small.

According to the third aspect of the present invention, there is provided a photographing lens which satisfies, in addition to condition (1) to (5), condition (7):

$$27 < \nu_1 - \nu_2 \quad (7)$$

where $\nu_1$: Abbe number of first lens $\nu_2$: Abbe number of second lens.

Inequality (7) represents a condition for chromatic aberration correction in the first lens group. When the value $\nu_1 - \nu_2$ is larger than the lower limit value, especially, on-axis chromatic aberration can easily be corrected.

When the photographing lens according to any one of the above aspects is used, a compact image sensing apparatus capable of obtaining a high-quality image can be provided.

As is apparent from the above aspects and their functions, according to the present invention, a compact photographing lens having a high resolution and a small number of constituent elements can be provided.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 5 is a sectional view of a photographing lens according to the third embodiment; and FIGS. 6A to 6C are views showing the spherical aberration, astigmatic aberration, and distortion of the photographing lens according to the third embodiment, respectively.

DETAILED DESCRIPTION OF THE PREFERRED EMBODIMENTS

Figure 1:
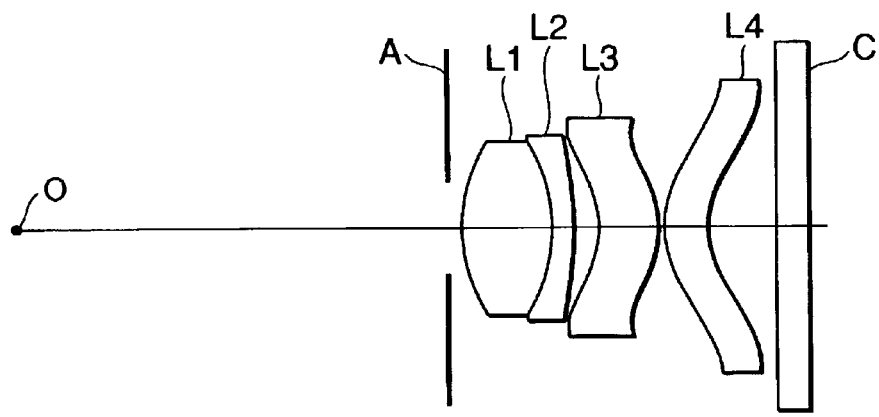
FIG. 1 is a sectional view of a photographing lens according to the first embodiment.

Preferred embodiments of the present invention will be described below with reference to the accompanying drawings.

As for symbols used in the embodiments, r is the radius of curvature of each surface of a lens, d is the lens thickness or lens interval, nd is the refractive index, ν d is the Abbe number. In the following lens data, an exponential number of 10 (e.g., $2.5 \times 10^{-3}$) is expressed using E (e.g., 2.5×E−03).

The Z-axis is set in the direction of optical axis, and the Y-axis is set in the direction perpendicular to the optical axis. Letting r be the paraxial radius of curvature, K be the conical constant, and A, B, C, D, and the aspherical coefficients, the shape of an aspherical surface is given by $$Z = (Y^2/r)[1 + \sqrt{\{1-(1+K)(Y/r)^2\}}] + A \cdot Y^4 + B \cdot Y^6 + C \cdot Y^8 + D \cdot Y^{10} + E \cdot Y^{12} \ldots$$

In the tables of the embodiments to be described below, * indicates a plastic lens. A change in refractive index due to a change in temperature is as follows. S indicates the aperture stop.

Refractive index at room temperature: 1.492
Refractive index at room temperature +30° C.: 1.488

First Embodiment:

Focal length: f = 5.57
F-number: F2.57
Angle of view: 2 ω = 60.8°

| S | r | d | nd | vd |
|---|---|---|---|---|
| S | ∞ | 0.31 | | |
| 1 | 3.720 | 2.09 | 1.58913 | 61.2 |
| 2 | −3.720 | 0.50 | 1.84666 | 23.8 |
| 3 | −10.614 | 0.65 | | |
| 4 | −1.802 | 1.37 | *1.49200 | 57.0 |
| 5 | −2.351 | 0.15 | | |
| 6 | 1.793 | 1.03 | *1.49200 | 57.0 |
| 7 | 1.739 | 1.64 | | |
| 8 | ∞ | 0.70 | 1.51633 | 64.1 |
| 9 | ∞ | | | |

Aspherical Coefficients
Fourth Surface
K=−4.25263E+00
A=−2.02582E−02
B=7.67839E−03
C=−6.13225E−04
D=−2.27421E−05
Fifth Surface
K=−4.25938E−01
A=5.90005E−03
B=4.41089E−03
C=−1.74510E−04
D=6.98329E−06
Sixth surface
K=−2.25148E+00
A=−6.40257E−03
B=6.87751E−04
C=−4.77388E−05
D=4.36413E−07
Seventh Surface
K=−1.52466E+00
A=−2.01441E−02
B=2.49116E−03
C=−1.82733E−04
D=4.16662E−06

A change in back-focus (Δfb) when the temperature increases by 30° C. from room temperature: +0.004 mm
Other conditions are $f/f_{1,2}=0.916$ $f/f_4=0.252$ $|f/r_{2-2}|=0.525$ $|f/r_{3-1}|=3.09$ $f/d_1=2.67$ $|f/f_{3,4}|=0.240$ $v_1-v_2=37.5$ where f: focal length of entire system
$f_{1,2}$: combined focal length of first and second lenses
$f_4$: focal length of fourth lens
$r_{2-2}$: radius of curvature of image-side surface of second lens
$r_{3-1}$: radius of curvature of object-side surface of third lens
$d_1$: central thickness of first lens The description of f, $f_{1,2}$, $f_4$, $r_{2-2}$, $r_{3-1}$ and $d_1$ also applies to the remaining embodiments to be described below.

Second Embodiment:

Focal length: f = 5.57
F-number: F2.08
Angle of view: 2 ω = 60.4°

| S | r | d | nd | vd |
|---|---|---|---|---|
| S | ∞ | 0.41 | | |
| 1 | 4.670 | 2.53 | 1.69350 | 53.2 |
| 2 | −3.979 | 0.50 | 1.84666 | 23.8 |
| 3 | −19.768 | 0.72 | | |
| 4 | −1.791 | 1.16 | *1.49200 | 57.0 |
| 5 | −1.847 | 0.15 | | |
| 6 | 2.085 | 1.10 | *1.49200 | 57.0 |
| 7 | 1.689 | 1.49 | | |
| 8 | ∞ | 0.70 | 1.51633 | 64.1 |
| 9 | ∞ | | | |

Aspherical Coefficients
First Surface
K=−2.18320E−01
A=−2.48444E−04
B=−8.09353E−05
C=−3.51579E−05
Fourth Surface
K=−4.61235E+00
A=−2.05741E−02
B=8.22552E−03
C=−5.77396E−04
D=8.45855E−07
Fifth Surface
K=−9.51130E−01
A=1.95794E−02
B=−1.29789E−03
C=6.06428E−04
D=−3.48617E−05
Sixth Surface
K=−3.91138E+00
A=−5.55520E−04
B=−4.99990E−04
C=9.67272E−06
D=−2.66025E−06
Seventh Surface
K=−3.84222E+00
A=−2.85200E−03
B=1.64492E−04
C=−6.64256E−05
D=2.40727E−06

A change in back-focus (Δfb) when the temperature increases by 30° C. from room temperature: +0.006 mm Other conditions are $f/f_{1,2}=0.838$ $f/f_4=-0.026$ $|f/r_{2-2}|=0.282$ $|f/r_{3-1}|=3.11$ $f/d_1=2.20$ $|f/f_{3,4}|=0.296$ $v_1-v_2=29.5$ Third Embodiment:

Focal length: f = 5.57
F-number: F2.89
Angle of view: 2 ω = 60.2°

| | r | d | nd | vd |
|---|---|---|---|---|
| S | ∞ | 0.30 | | |
| 1 | 3.245 | 2.36 | 1.48749 | 70.2 |
| 2 | −2.493 | 0.56 | 1.84666 | 23.8 |
| 3 | −3.799 | 0.51 | | |
| 4 | −1.333 | 1.19 | *1.49200 | 57.0 |
| 5 | −2.434 | 0.10 | | |
| 6 | 1.601 | 1.01 | *1.49200 | 57.0 |
| 7 | 1.739 | 1.71 | | |
| 8 | ∞ | 0.70 | 1.51633 | 64.1 |
| 9 | ∞ | | | |

Aspherical Coefficients
Fourth Surface
K=−3.28704E+00
A=−2.13513E−02
B=1.40901E−02
C=−4.72643E−03
D=9.00060E−04
E=−7.32140E−05
Fifth Surface
K=−9.30905E−02
A=1.80019E−02
B=4.78605E−03
C=−3.37794E−04
D=−4.73613E−05
E=1.35961E−05
Sixth Surface
K=−2.43176E+00
A=−7.29037E−04
B=−1.23875E−04
C=−2.96179E−05
D=−3.06137E−09
E=1.67186E−07
Seventh Surface
K=−1.00536E+00
A=−2.62706E−02
B=2.53339E−03
C=−2.05551E−04
D=6.19328E−06
E=−6.07915E−09

A change in back-focus (Δfb) when the temperature increases by 30° C. from room temperature: +0.002 mm Other conditions are $f/f_{1,2}=0.951$ $f/f_4=0.367$ $|f/r_{2-2}|=1.466$ $|f/r_{3-1}|=4.18$ $f/d_1=2.36$ $|f/f_{3,4}|=0.175$ $v_1-v_2=46.7$ As is apparent from the above embodiments, the photographing lens of the present invention satisfies at least the following conditions (1) to (5):

$$0.80<f/f_{1,2}<1.00 \quad (1)$$

$$-0.10<f/f_4<0.45 \quad (2)$$

$$0.2<|f/r_{2-2}|<1.6 \quad (3)$$

$$2.9<|f/r_{3-1}|<4.4 \quad (4)$$

$$2.0<f/d_1<2.9 \quad (5)$$

The function (influence on the photographing lens) by conditions (1) to (5) will be described.

Inequality (1) defines the refracting power of the first lens group. When the value $f/f_{1,2}$ is equal to or larger than the upper limit value, the refracting power of the first lens group increases. Since the spherical aberration and coma increase, and the radius of curvature of the spherical surface of each lens of the first lens group become small, resulting in difficulty in process. On the other hand, when the value $f/f_{1,2}$ is equal to or smaller than the lower limit value, the refracting power of each of the second and third lens groups which are constituted by single lenses must be increased, resulting in large chromatic aberration.

Inequality (2) is related to the refracting power of the third lens group, i.e., fourth lens. When the value $f/f_4$ is equal to or larger than the upper limit value, the refracting power of the third lens group increases. Since the telephoto ratio of the entire lens system (total length with respect to the focal length) increases, size reduction is difficult. On the other hand, when the value $f/f_4$ is equal to or smaller than the lower limit value, it is advantageous for size reduction. However, the telecentricity of the peripheral portion degrades, and the distortion can hardly be corrected.

Inequality (3) is related to the shape of the second lens in the first lens group. When the value $|f/r_{2-2}|$ is equal to or larger than the upper limit value, the radius of curvature of the image-side surface of the second lens becomes small. The radius of curvature of the second lens surface on the side of the object O must be made especially small mainly to satisfactorily correct the on-axis chromatic aberration. This degrades the processibility and makes spherical aberration correction difficult. On the other hand, when the value $|f/r_{2-2}|$ is equal to or smaller than the lower limit value, the on-axis spatial interval between the second and third lenses must be increased to ensure the abutting height between the second lens and the third lens. Hence, size reduction becomes difficult.

Inequality (4) is related to the shape of the second lens group, i.e., third lens. When the value $|f/r_{3-1}|$ is equal to or larger than the upper limit value, the radius of curvature of the third lens surface on the side of the object O decreases.

This increases off-axis coma flare and degrades imaging performance. On the other hand, when the value $|f/r_{3\text{-}1}|$ is equal to or smaller than the lower limit value, the off-axis principal ray angle after exiting the third lens increases, resulting in degradation in telecentricity.

Inequality (5) is related to the shape of the first lens in the first lens group. When the value $f/d_1$ is equal to or smaller than the lower limit value, the first lens is too thick, and no sufficient back-focus can be ensured. On the other hand, when the value $f/d_1$ is equal to or larger than the upper limit value, the back-focus can easily be ensured, although the processibility of the first lens degrades.

Hence, when the photographing lens has the above-described arrangement, aberrations can satisfactorily be corrected all over the image area, and size reduction can be implemented. The reason for this will be described below.

As the basic characteristic feature of the photographing lens according to the present invention, the photographing lens is formed from a first lens group having a high positive refracting power and, subsequently, second and third lens groups both of which have low refracting powers. That is, since the first lens group bears the large part of the refracting power of the entire lens system, the total lens length decreases.

For aberration correction, the first lens group is constituted by the first lens having a positive refracting power and the second lens having a negative refracting power whereby the spherical aberration, coma, and chromatic aberration near the on-axis structure are mainly corrected. The second lens group (third lens) is formed from a meniscus lens which has at least one aspherical refracting surface and a concave surface facing the object O, thereby satisfactorily correcting mainly the coma and astigmatic aberration. At least one aspherical surface is formed in the third lens group (fourth lens), thereby satisfactorily correcting mainly the distortion. In addition, the second lens in the first lens group is formed from a meniscus lens with its concave surface facing the object O. Accordingly, the chromatic aberration and spherical aberration can satisfactorily be corrected on the connected surface between the first and second lenses. Furthermore, since the image-side surface of the second lens is a convex surface, the abutting height (opposing optical surfaces abut against each other at a position separated from the optical axis) with respect to the third lens having a concave surface on the side of the object O can be ensured, and the on-axis spatial interval can be reduced. This is advantageous in reducing the total lens length. The third lens group (fourth lens) is preferably formed from a meniscus lens with its convex surface facing the object O side. With this structure, especially, the distortional aberration and telecentricity at the peripheral portion can satisfactorily be corrected.

The third and fourth lenses in the photographing lens according to the present invention can be made of a resin material that satisfies $$|f/f_{3,4}|<0.35 \quad (6)$$

where $f_{3,4}$: combined focal length of third and fourth lenses

Inequality (6) is related to the combined refracting power of the second and third lens groups, i.e., the third and fourth lenses. When both the second and third lens groups are made of a resin material, i.e., plastic, an aspherical surface can be applied. In addition, the cost reduction effect can be expected. As a characteristic feature of a plastic lens, it is readily affected by a change in temperature. However, when the value $|f/f_{3,4}|$ representing the combined refracting power of the second and third lens groups falls within the range of inequality (6), focal point movement in case of a change in temperature can be made sufficiently small.

According to the present invention, a photographing lens which satisfies condition (7) below in addition to conditions (1) to (5) above is provided.

$$27<v_1-v_2 \quad (7)$$

where $v_1$: Abbe number of first lens $v_2$: Abbe number of second lens

Inequality (7) represents a condition for chromatic aberration correction in the first lens group. When the value $v_1-v_2$ is larger than the lower limit value, especially, on-axis chromatic aberration can easily be corrected.

Figure 2A:
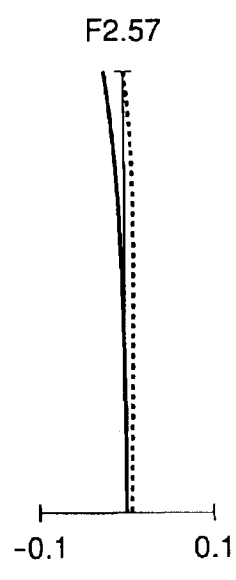
FIGS. 2A to 2C are views showing the spherical aberration, astigmatic aberration, and distortion of the photographing lens according to the first embodiment, respectively.
Figure 2B:
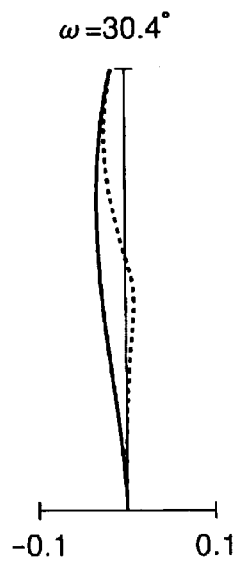
Figure 2C:
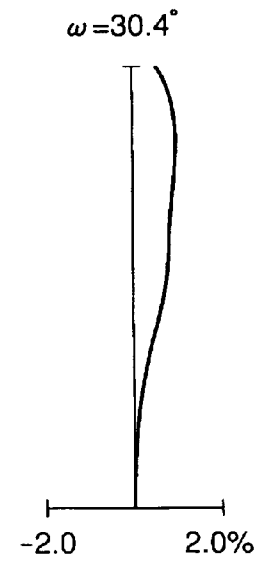

The accompanying drawings will be described below. FIG. 1 is a sectional view of the photographing lens according to the first embodiment. Reference symbol A denotes an aperture stop; L1, a first lens; L2, a second lens; L3, a third lens; L4, a fourth lens; and C, a cover plate such as a CCD face plate or low-pass filter integrally or separately prepared on the image sensing device (not shown). FIGS. 2A to 2C are views of aberrations of the photographing lens according to the first embodiment. Referring to FIG. 2A that shows spherical aberration, the solid line indicates aberration for d line (wavelength: 587.6 nm), and the dotted line indicates aberration for g line (wavelength: 435.8 nm). Referring to FIG. 2B that shows astigmatic aberration, the solid line indicates aberration for a sagittal image plane, and the dotted line indicates aberration for meridional image plane.

Figure 3:
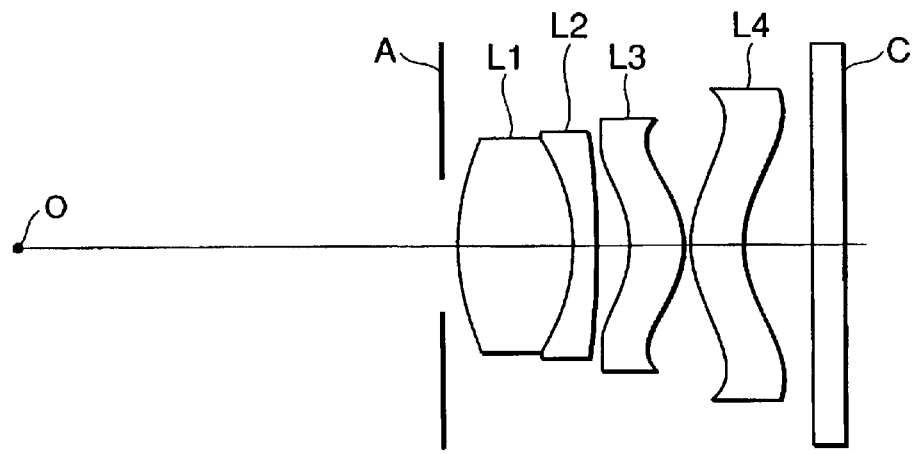
FIG. 3 is a sectional view of a photographing lens according to the second embodiment.
Figure 4A:
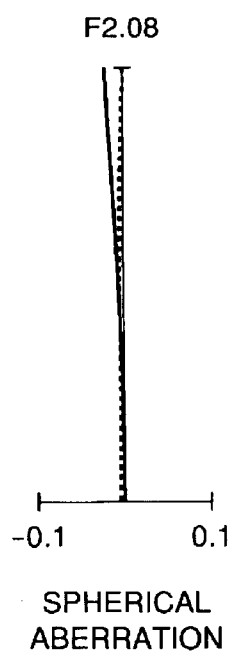
FIGS. 4A to 4C are views showing the spherical aberration, astigmatic aberration, and distortion of the photographing lens according to the second embodiment, respectively.
Figure 4B:
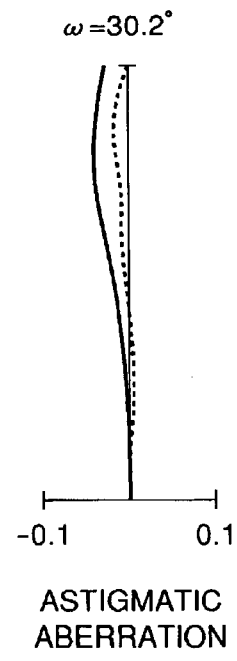
Figure 4C:
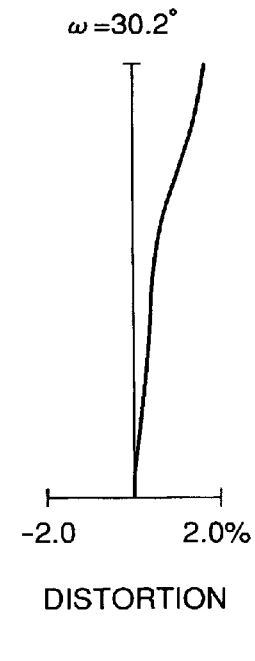

FIG. 3 is a sectional view of the photographing lens according to the second embodiment. Reference symbol A denotes an aperture stop; L1, a first lens; L2, a second lens; L3, a third lens; L4, a fourth lens; and C, a cover plate such as a CCD face plate or low-pass filter integrally or separately prepared on the image sensing device (not shown). FIGS. 4A to 4C are views of aberrations of the photographing lens according to the second embodiment. Referring to FIG. 4A that shows spherical aberration, the solid line indicates aberration for d line, and the dotted line indicates aberration for g line. Referring to FIG. 4B that shows astigmatic aberration, the solid line indicates aberration for a sagittal image plane, and the dotted line indicates aberration for meridional image plane.

FIG. 5 is a sectional view of the photographing lens according to the third embodiment. Reference symbol A denotes an aperture stop; L1, a first lens; L2, a second lens; L3, a third lens; L4, a fourth lens; and C, a cover plate such as a CCD face plate or low-pass filter integrally or separately prepared on the image sensing device (not shown). FIGS. 6A to 6C are views of aberrations of the photographing lens according to the third embodiment. Referring to FIG. 6A that shows spherical aberration, the solid line indicates aberration for d line, and the dotted line indicates aberration for g line. Referring to FIG. 6B that shows astigmatic aberration, the solid line indicates aberration for a sagittal image plane, and the dotted line indicates aberration for meridional image plane.

The preferred embodiments of the present invention have been described above with reference to the accompanying drawings. However, the present invention is not limited to the above embodiments, and various changes and modifications can appropriately be made. For example, the photographing lens of the present invention can be used not only for an image sensing apparatus such as a digital still camera but also a silver halide film camera.

What is claimed is:

1. A compact photographing lens, wherein;

an aperture stop is arranged at a position closest to an object, a first lens group, a second lens group, and a third lens group are arranged sequentially from the object side, said first lens group is formed by arranging, sequentially from the object side, a first lens having a positive refracting power and a second lens having a negative refracting power and bonded to the first lens, the second lens being formed from a meniscus lens with a concave surface facing the object side, said second lens group is formed from only a third lens as a meniscus lens which has at least one aspherical refracting surface and a concave surface facing the object side, said third lens group is formed from only a fourth lens as a meniscus lens which has at least one aspherical refracting surface and a convex surface facing the object side, and said photographing lens satisfies conditions (1) to (5):

$$0.80 < f/f_{1,2} < 1.00 \qquad (1)$$

$$-0.10 < f/f_4 < 0.45 \qquad (2)$$

$$0.2 < |f/r_{2\text{-}2}| < 1.6 \qquad (3)$$

$$2.9 < |f/r_{3\text{-}1}| < 4.4 \qquad (4)$$

$$2.0 < f/d_1 < 2.9 \qquad (5)$$

where $f$: focal length of entire system $f_{1,2}$: combined focal length of first and second lenses $f_4$: focal length of fourth lens $r_{2\text{-}2}$: radius of curvature of image-side surface of second lens $r_{3\text{-}1}$: radius of curvature of object-side surface of third lens $d_1$: central thickness of first lens.

2. A lens according to claim 1, wherein both the third and fourth lenses are made of a resin material and satisfy condition (6):

$$|f/f_{3,4}| < 0.35 \qquad (6)$$

where $f_{3,4}$: combined focal length of third and fourth lenses.

3. A lens according to claim 2, wherein in addition to condition (1) to (5), said photographing lens satisfies condition (7):

$$27 < v_1 - v_2 \qquad (7)$$

where $v_1$: Abbe number of first lens $v_2$: Abbe number of second lens.

* * * * *